June 5, 1928.
H. ENGELBERT
AIR CHUCK
Filed March 3, 1927
1,672,755
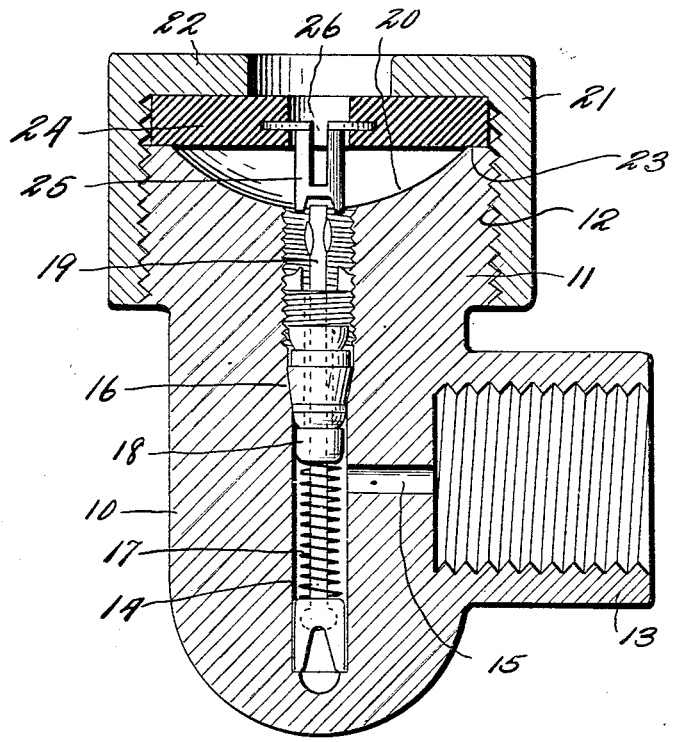
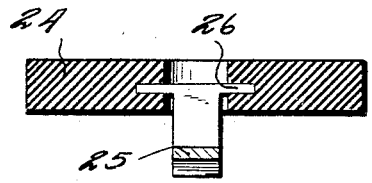
Inventor
H. Engelbert
By Watson E. Coleman
Attorney Patented June 5, 1928.

1,672,755

UNITED STATES PATENT OFFICE.

HENRY ENGELBERT, OF BELOIT, KANSAS.

AIR CHUCK.

Application filed March 3, 1927. Serial No. 172,500.

This invention relates to chucks such as are applied on the end of air hose for the purpose of detachably connecting the air hose with the air valve of a pneumatic tire.

One of the objects of this invention is to provide an air chuck of a very simple construction and which is formed of standard and easily procured parts so as to permit the air chuck to be readily repaired when desired.

A further object is to provide an air chuck of this kind wherein the valve which may be of any of the standard forms, may be readily removed or replaced.

A still further object is to provide an air chuck having therein a rubber gasket which may be readily replaced when necessary and which has no pressure on it when the chuck is not in use so that it will last indefinitely.

My invention is illustrated in the accompanying drawings wherein:—

Figure 1 is a vertical sectional view of an air hose chuck constructed in accordance with my invention;

Fig. 2 is a fragmentary section through the gasket 24 and the rivet 25 at right angles to the section in Figure 1.

Referring to the drawings 10 designates the body of the chuck, this body having an enlarged head 11 at one end formed with exterior screw-threads 12. At the other end of the chuck there is an angular branch 13 interiorly screw-threaded for engagement with an air hose connection. A longitudinally extending valve chamber 14 is formed within the body communicating by a port 15 with the interior of the branch 13, this valve chamber being formed with a seat 16 for a valve. Disposed within this air chamber is any suitable valve core, such as a Schrader valve core. Inasmuch as this valve is well known it is not considered necessary to describe the valve structure other than to say that the spring 17 urges the valve 18 closed and that this valve is formed with a centrally disposed pin 19 extending upward through the chamber and projecting slightly beyond the slightly concave face 20 of the valve body.

Having screw-threaded engagement with the head 11 is the annular cap 21 and disposed between the inwardly extending flange 22 of this cap and the seat 23 exterior to the cup-shaped depression 20, is the rubber gasket 24 having a central opening. Within this opening is disposed a hollow point rivet 25 having a head 26 which is set within the rubber gasket. This rivet extends downward below the gasket and to the entrance of the bore 14 and in normal position has its inner end disposed just above the pin 19. Extending from the head end of the rivet to a point adjacent the inner end thereof, is a slot 26 the purpose of which will presently appear.

It will be noted that when the Schrader valve is closed, there is no pressure upon the rubber gasket whatsoever. This permits the gasket to last indefinitely which it will not do if there is more or less constant pressure on it.

In the use of this device, the opening of the chuck is applied over the tire valve stem and the pressure of the stem depresses the rubber gasket carrying with it the split rivet 25 which in turn depresses the valve core pin 19, letting air pass through the slot 26 to the tire. In case the valve core should become leaky or otherwise inoperative, it is a very slight matter to replace the valve core, it being only necessary to remove the cap and gasket and then unscrew the valve core from the outer interiorly screw-threaded end of the valve chamber 14. This may be done often under pressure. Attention is called to the fact that the cap 21 may be readily unscrewed by hand without the use of a wrench and thus the valve or the gasket can be readily replaced. The mechanism which I have described is much less complicated than the ordinary air chuck and the chuck has been found to be extremely satisfactory in practice. Inasmuch as it is made of standard parts, it may be readily assembled or repaired when necessary.

I claim:—

1. An air chuck for air hose comprising a chuck body having a concave face at one end and formed with a longitudinally extending valve chamber, an air valve therein having a central stem extending to the concave face of the chuck body, an annular cap engaging that end of the chuck body having the concave face, and an elastic gasket disposed between the cap and the face of the chuck body and extending across the central opening of the cap, said gasket being annular, and a rivet having a head inserted in the gasket, the shank of the rivet extending beyond the gasket and the shank and head being slotted, the shank being adapted when depressed to engage the stem to open the valve.

2. An air chuck comprising a body having a screw-threaded branch at one end and having a depression at its other end, and an annular seat exterior to the depression, the body being formed with a longitudinally extending valve chamber screw-threaded to engage a valve, a valve disposed within said chamber and having a longitudinally extending stem projecting slightly beyond the face of the depression, an annular cap having screw-threaded engagement with the body and extending over the depression in said body, an annular gasket engaging the seat on the said depression and engaged by said cap, and a rivet formed with a longitudinally extending slot in its head and shank, the head engaging the gasket and said shank when the gasket is depressed engaging against said valve stem to open the valve.

3. An air chuck for air hose comprising a chuck body having a concave face at one end and formed with a longitudinally extending valve chamber, an air valve therein having a central stem extending to the concave face of the chuck body, an annular cap engaging that end of the chuck body having the concave face, and an elastic gasket disposed between the cap and the face of the chuck body and extending across the central opening of the cap, said gasket being annular, and a tubular rivet having a head inserted in the gasket, the rivet extending beyond the gasket and being adapted when depressed to engage the stem to open the valve, the rivet being slotted from the head end thereof to a point inwardly of the inner face of the gasket.

In testimony whereof I hereunto affix my signature.

HENRY ENGELBERT.